United States Patent
Yang

(10) Patent No.: US 9,688,303 B1
(45) Date of Patent: Jun. 27, 2017

(54) SYSTEM AND METHOD FOR DETECTING FAILURE OF A STEERING ANGLE SENSOR

(71) Applicant: HIWIN TECHNOLOGIES CORP., Taichung (TW)

(72) Inventor: Chih-Wei Yang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 15/040,760

(22) Filed: Feb. 10, 2016

(51) Int. Cl.
| B62D 6/00 | (2006.01) |
| B62D 5/04 | (2006.01) |
| B60W 10/20 | (2006.01) |
| B60W 10/30 | (2006.01) |

(52) U.S. Cl.
CPC .......... B62D 5/049 (2013.01); B60W 10/20 (2013.01); B60W 10/30 (2013.01); B62D 5/046 (2013.01); *B60W 2510/20* (2013.01); *B60W 2520/06* (2013.01); *B60W 2520/30* (2013.01); *B60W 2540/18* (2013.01); *B60W 2710/0677* (2013.01); *B60W 2710/207* (2013.01)

(58) Field of Classification Search
CPC ....... B62D 5/049; B62D 5/046; B60W 10/20; B60W 10/30; B60W 2510/20; B60W 2520/06; B60W 2520/30
See application file for complete search history.

(56) References Cited

U.S. PATENT DOCUMENTS

| 8,849,498 B2 | 9/2014 | Lee | |
| 2007/0296375 A1* | 12/2007 | Sakaguchi | H02P 29/032 318/811 |
| 2010/0094505 A1* | 4/2010 | Kariatsumari | B62D 5/0472 701/41 |
| 2012/0072077 A1* | 3/2012 | Park | B62D 5/049 701/42 |
| 2012/0232759 A1* | 9/2012 | Oniwa | B62D 5/0463 701/41 |
| 2012/0271513 A1* | 10/2012 | Yoneda | B62D 5/0493 701/41 |

FOREIGN PATENT DOCUMENTS

| CN | 100519301 C | 7/2009 |
| JP | 201454890 A | 3/2014 |

* cited by examiner

*Primary Examiner* — Ian Jen
(74) *Attorney, Agent, or Firm* — Wang Law Firm, Inc.

(57) ABSTRACT

A system and method for detecting failure of a steering angle sensor include: a steering angle sensor, an angular position encoder and an electronic control unit. The electronic control unit reads an initial value of the steering wheel rotation angle signal and estimates a rotation angle of a steering wheel based on the motor rotation angle signal, the electronic control unit checks if a difference between an actual value of the steering wheel rotation angle signal and an estimated rotation angle of the steering wheel is smaller than a predetermined value or not, if the difference is bigger than the predetermined value, it means that the steering wheel rotation angle signal fails, and the estimated rotation angle of the steering wheel serves as a substitute signal and is sent to the electronic control unit.

10 Claims, 5 Drawing Sheets

SYSTEM AND METHOD FOR DETECTING FAILURE OF A STEERING ANGLE SENSOR

BACKGROUND OF THE INVENTION

Field of the Invention

The present invention relates to an electrically assisted steering system for a vehicle, and more particularly to a system and method for detecting failure of a steering angle sensor.

Related Prior Art

The existing steering wheels for vehicles are mostly provided with a SAS (steering angle sensor) to sense the rotation angle and speed of the steering wheel. In addition to acquiring the angle of the steering wheel rotated by the driver, the SAS also sends the acquired data to the ECU (electronic control unit), and the data is used as reference data for the steering system and steering operation.

The SAS is usually installed on the steering shaft of the wheel. When the steering shaft rotates with the steering wheel, rotation direction and angle will be detected by the SAS and inputted to ECU of the EPS (electric power steering) as one of the inputted signals. Then, EPS calculates required assistant power and direction based on the inputted signals regarding rotation torque and speed of the vehicle, and sends a control signal to the electric motor. Then, the motor generates the required rotation torque as an assistant power and sends it to the steering tie rod via the gear reduction mechanism and toothed wheel and rack.

ECU of the EPS acquires these data and calculates the difference between torque required for normal safe driving and the torque applied by the driver when the driver has the intention to make a turn. Then, the ECU gives orders to adjust the assistant power generated by the motor, which consequently corrects the torque required when the driver makes a turn, thus enhancing driving safety.

EPS must be equipped with the SAS, the SAS converts the rotation angle of the steering wheel into a signal indicating the direction that the driver intends to drive. EPS can tell the intention of the driver by calculating the rotation angle and the rate of change of the rotation angle. However, when a failure of the SAS occurs, the ECU of the EPS is unable to tell the turning direction of the vehicle, which negatively affects the handling of the steering wheel.

The technique disclosed in U.S. Pat. No. 8,849,498B2 and Chinese Pat. No. 100519301C is to check whether the rotation direction of the motor is the same as the rotation direction of the steering wheel, if so, it means that the rotation angle signal of the steering wheel works well. If not, it has to check whether the rotation direction of the motor is the same as the torque direction of the steering wheel, if so, go back to the initial step and recheck again, if they are still not the same, it means that the rotation angle of the steering wheel fails, and the failure signal will be shared with other control modules.

The abovementioned patents are able to check whether the rotation angle signal of the steering wheel fails or not, however, no matter the way of checking, they always use the direction as a decision criteria. The use of direction as the only decision criteria would lead to inaccurate determination since there are too much variables. Besides, the abovementioned patents only can check the failure of the rotation angle signal of the steering wheel, but fail to disclose a substitute technical means for the rotation angle signal of the steering wheel. Therefore, if the rotation angle signal of the steering wheel fails all of a sudden, it will cause the failure of the control system, and negatively affect the handling of the steering wheel.

JP 2014054890 employs the rotation angle of the steering wheel, the lateral swing rate of the vehicle, and the lateral acceleration as reference parameters to check if the SAS fails or not. If SAS fails, then it has to check, at different speeds of the vehicle, if torque and rotation angle signal of the steering wheel are within the predetermined range, and count the number of times of error occurrence. When the number of times of error occurrence reaches a predetermined value, it means the failure of the rotation angle signal of the steering wheel.

The above Japan patent also is able to check whether the rotation angle signal of the steering wheel fails or not, however, it requires more sensors to detect the lateral swing rate and the lateral acceleration, which inevitably increases the cost. Besides, in the existing electric assistant steering power system, the data of the lateral swing and lateral acceleration is normally acquired by external signals. In fact, these two kinds of signals cannot be acquired when the vehicle is moving, and as a result, the checking cannot be performed. Besides, the abovementioned Japan patent only can check the failure of the rotation angle signal of the steering wheel, but fails to disclose a substitute technical means for the rotation angle signal of the steering wheel. Therefore, if the rotation angle signal of the steering wheel fails out of a sudden, it will cause the failure of the control system, and negatively affect the handling of the steering wheel.

The present invention is aimed at solving the above problem, that is, when the rotation angle signal of the steering wheel fails, it won' cause the failure of the control system, and negatively affect the handling of the steering wheel.

SUMMARY

The present invention is aimed at providing a system and method for detecting failure of a steering angle sensor, when the steering wheel rotation angle signal fails, the estimated rotation angle of the steering wheel can serve as a substitute signal and is sent to the ECU, so as to prevent negative influence on the handling of the steering wheel.

The present invention is further aimed at providing a system and method for detecting failure of a steering angle sensor, wherein the ECU can read an initial value of the steering wheel rotation angle signal and estimate the rotation angle of the steering wheel based on the motor rotation angle signal.

Therefore, the system and method for detecting failure of a steering angle sensor provided by the present invention includes a steering angle sensor, an angular position encoder and an electronic control unit. The electronic control unit reads an initial value of the steering wheel rotation angle signal and estimates a rotation angle of a steering wheel based on the motor rotation angle signal, the electronic control unit checks if a difference between an actual value of the steering wheel rotation angle signal and an estimated rotation angle of the steering wheel is smaller than a predetermined value or not, if the difference is bigger than the predetermined value, it means that the steering wheel rotation angle signal fails, and the estimated rotation angle of the steering wheel serves as a substitute signal and is sent to the electronic control unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
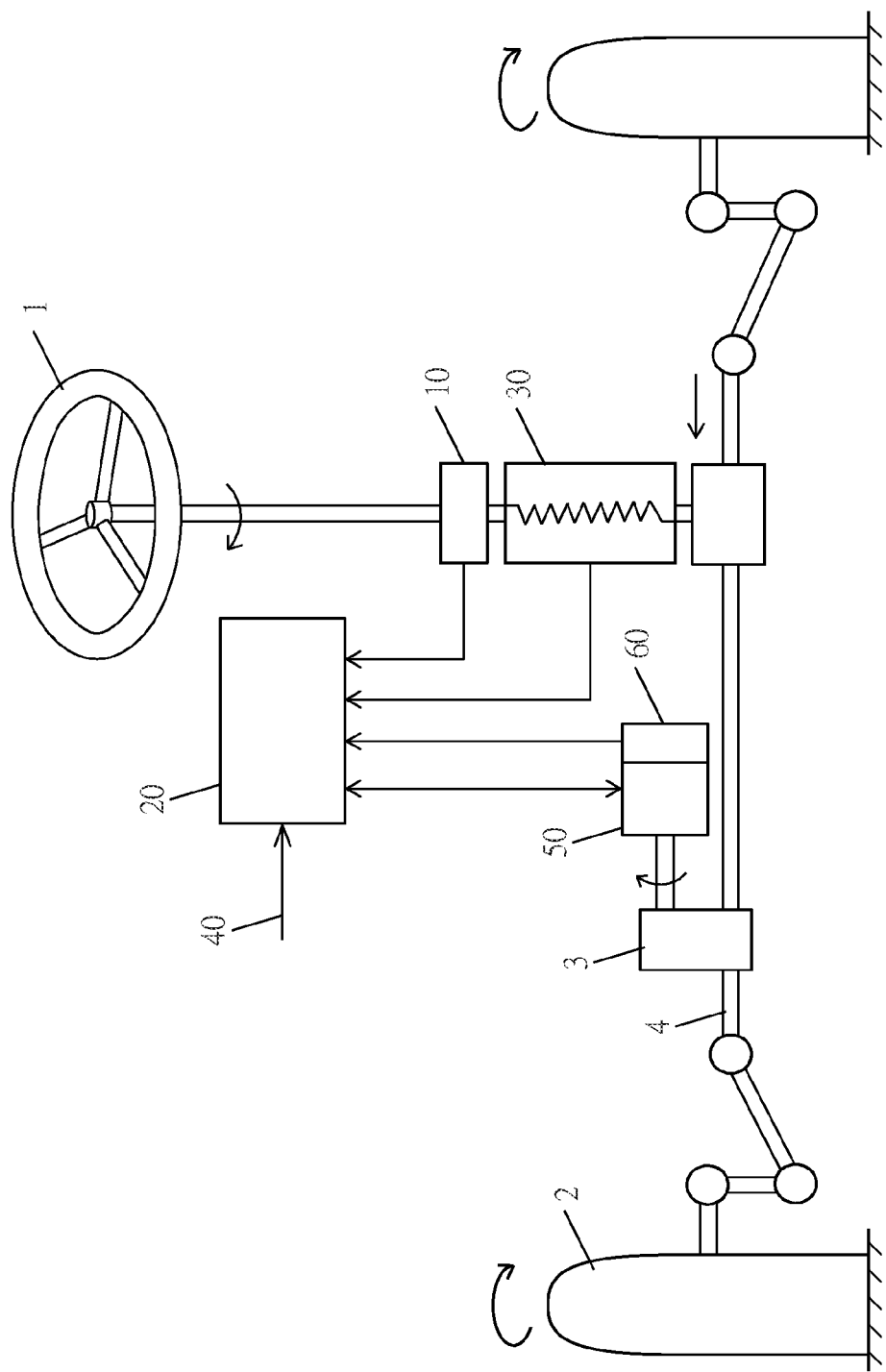
FIG. 1 is a perspective view of a system for detecting failure of a steering angle sensor in accordance with the present invention.

Referring to FIG. 1, a system for detecting failure of a steering angle sensor 10 in accordance with the present invention comprises: the steering angle sensor 10, an ECU 20, a torque sensor 30, a velocity sensor 40, a motor 50, and an angular position encoder 60.

The steering angle sensor 10 is connected to a steering wheel 1 and serves to receive a steering wheel rotation signal and send it to the ECU 20.

The torque sensor 30 is connected to the steering angle sensor 10 and serves to detect the relative displacement signal between the input shaft and the output shaft of the steering wheel, and then sends it to the ECU 20.

The velocity sensor 40 receives a velocity signal and sends it to the ECU 20.

The motor 50 is connected to wheels 2 via a gear reduction mechanism 3 and a steering tie rod 4, and receives control current from the ECU 20 and provides an assistance power to the steering tie rod 4 to turn the wheels 2.

The angular position encoder 60 sends a motor rotation position signal to the ECU 20 to control the motor 50.

The ECU 20 reads an initial value of the steering wheel rotation angle signal and estimates the rotation angle of the steering wheel based on the motor rotation position signal.

In this embodiment, the ECU 20 checks if the steering wheel rotation angle signal of the steering angle sensor 10 fails or not. If the steering wheel rotation angle signal works well, the ECU 20 reads an initial value of the steering wheel rotation angle signal and the motor rotation position signal of the angular position encoder 60, and then estimates the rotation angle of the steering wheel.

Therefore, if the steering wheel rotation angle signal fails, the estimated rotation angle of the steering wheel can be sent to the ECU 20 as a substitute signal, so the ECU 20 can do the compensation calculation to prevent negative influence on the handling of the steering wheel, when the rotation angle signal of the steering wheel fails all of a sudden.

The rotation angle of the steering wheel is estimated as follows:

r=Sr*Gr/L; //calculating the total reduction ratio
if (⊖−⊖_delay>614)//614 //check overflow of ⊖
i++; //clockwise rotation overflow in total
if (⊖−⊖_delay<−614)
i−−; //counterclockwise rotation overflow in total
if (i>0)
⊖_add=[(4095−⊖_init)+(i−1)*4095+⊖]/r/p; //calculate the angle change of the clockwise rotation overflow
else if (i<0)
⊖_add=[(0−⊖_init)+(i+1)*4095+(⊖−4095)]/r/p; //calculate the angle change of the counterclockwise rotation overflow
else
⊖_add=(⊖−⊖_init)/r/p; //calculate the angle change of not overflow occurs
angle_est=angle_init+⊖_add; //estimate the rotation angle The definitions of the above parameters: ⊖: signal of the angular position encoder, ⊖_delay: signal to delay a period of time for the angular position encoder to sample, ⊖_init: initial value of the angular position encoder, ⊖_add: value of change of the angular position encoder, P: value corresponding to 360 degree rotation of the angular position encoder (ex:count=3*4095), Sr: linear angle ratio, L: lead of the screw, Gr: pulley reduction ratio, r: total reduction ratio, angle_init: initial value of the steering angle sensor, angle_est: estimated rotation angle of the steering wheel.

Figure 4:
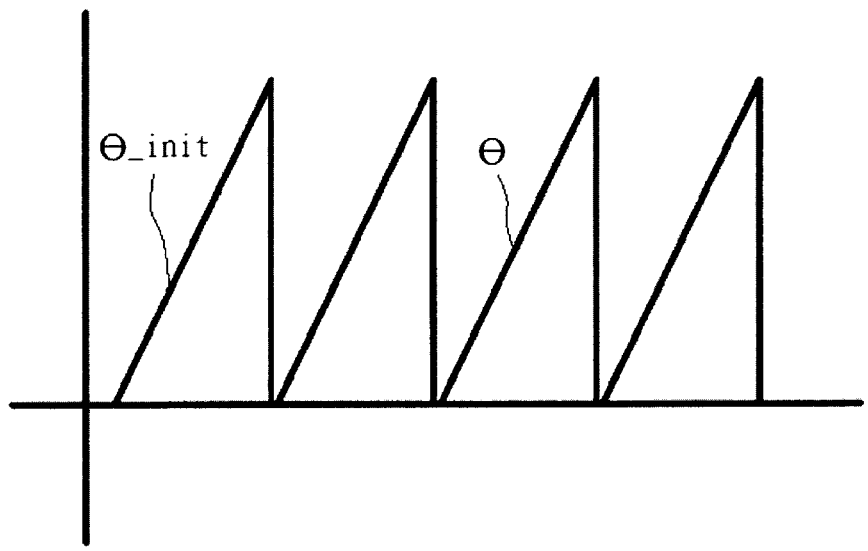
FIG. 4 shows that the motor rotation position signal ⊖_init changes to ⊖ (increase means clockwise rotation), after two times of overflow i=2, and substitute into a formula which meets the relation i>0, to calculate the value ⊖_add of change of the angular position encoder.

For the first embodiment, please refer to FIG. 4.

FIG. 4 shows that the motor rotation position signal ⊖_init changes to ⊖ (increase means clockwise rotation), after two times of overflow i=2, and substitute into a formula which meets the relation i>0, to calculate the value ⊖_add of change of the angular position encoder.

Figure 5:
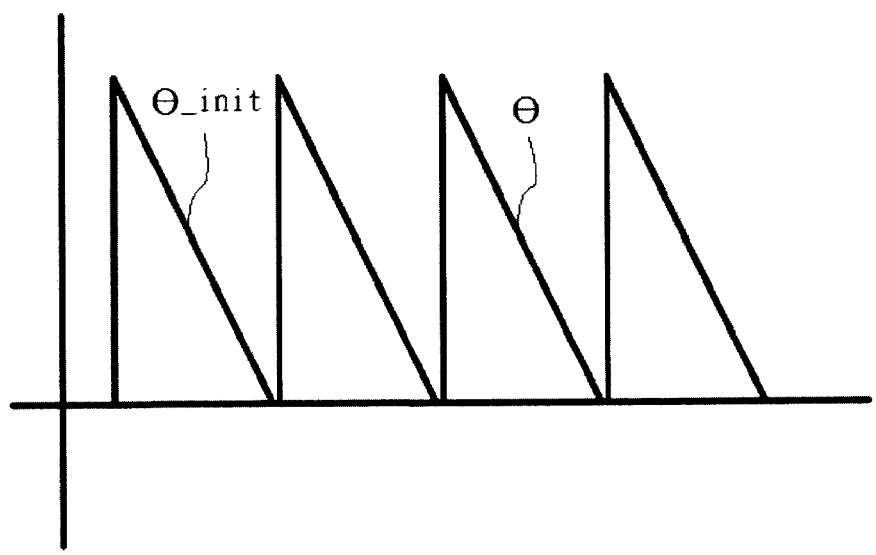
FIG. 5 shows that the motor rotation position signal ⊖_init changes to ⊖ (decrease means counterclockwise rotation), after two times of overflow i=−2, and substitute into a formula which meets the relation i<0, to calculate the value ⊖_add of change of the angular position encoder.

For the second embodiment, please refer to FIG. 5.

FIG. 5 shows that the motor rotation position signal ⊖_init changes to ⊖ (decrease means counterclockwise rotation), after two times of overflow i=−2, and substitute into a formula which meets the relation i<0, to calculate the value ⊖_add of change of the angular position encoder.

Figure 6:
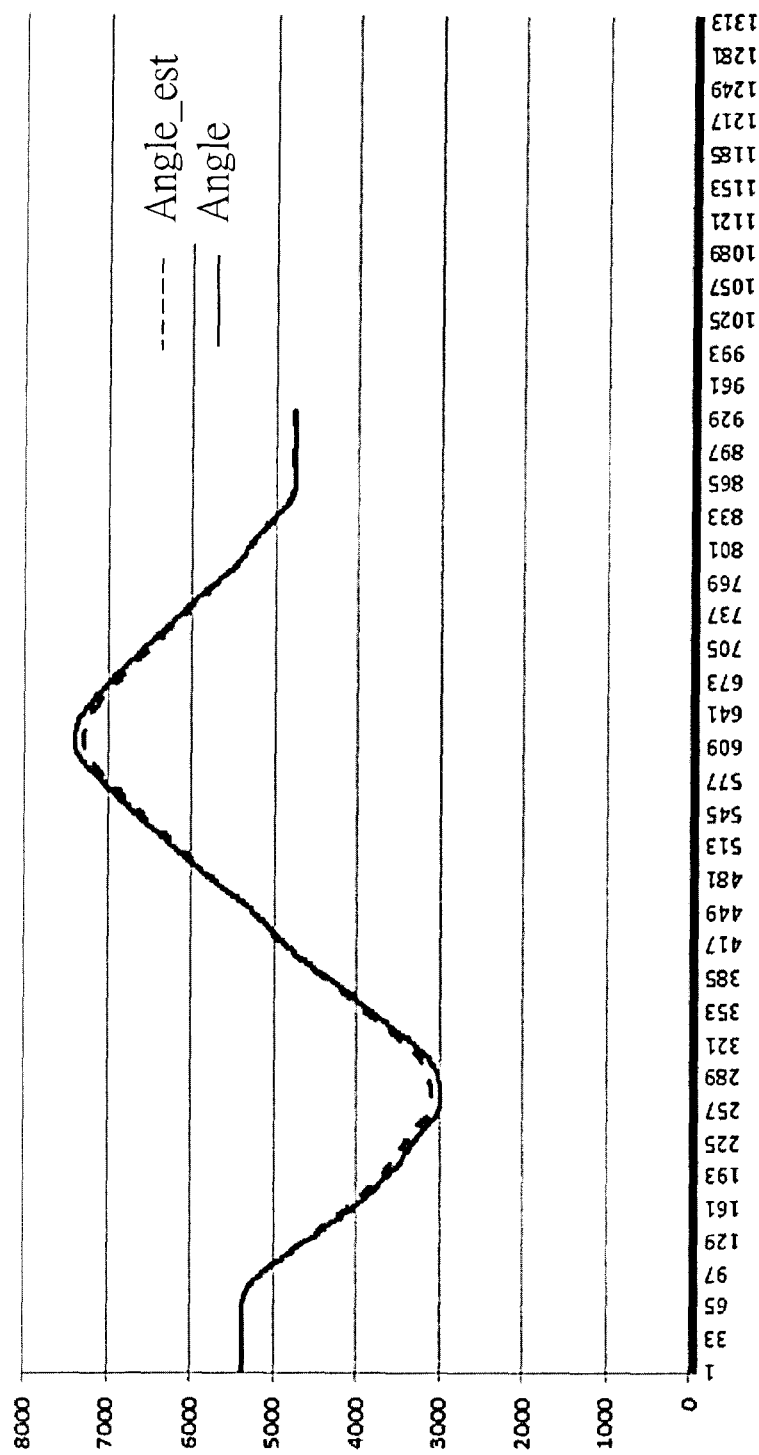
FIG. 6 shows the relation between the estimated steering wheel rotation angle and the actual value of the steering wheel rotation angle.

Please refer to FIG. 6, the curve shows the relation between the estimated steering wheel rotation angle and the actual value of the steering wheel rotation angle, and the curve is obtained by plugging the estimated steering wheel rotation angle and the actual value of the steering wheel rotation angle into the above formulas.

FIG. 6 shows that the estimated steering wheel rotation angle is 3112, and the actual value of the steering wheel rotation angle is 2997, the angle difference is approximately 5 degrees (3112−2997=115, 115*80/4095=5.054 . . . ) which is very small. Therefore, if the steering wheel rotation angle signal fails, the estimated rotation angle of the steering wheel can truly serve as a substitute signal and is sent to the ECU 20, so the ECU 20 can do the compensation calculation to prevent negative influence on the handling of the steering wheel, when the rotation angle signal of the steering wheel fails all of a sudden.

Figure 2:
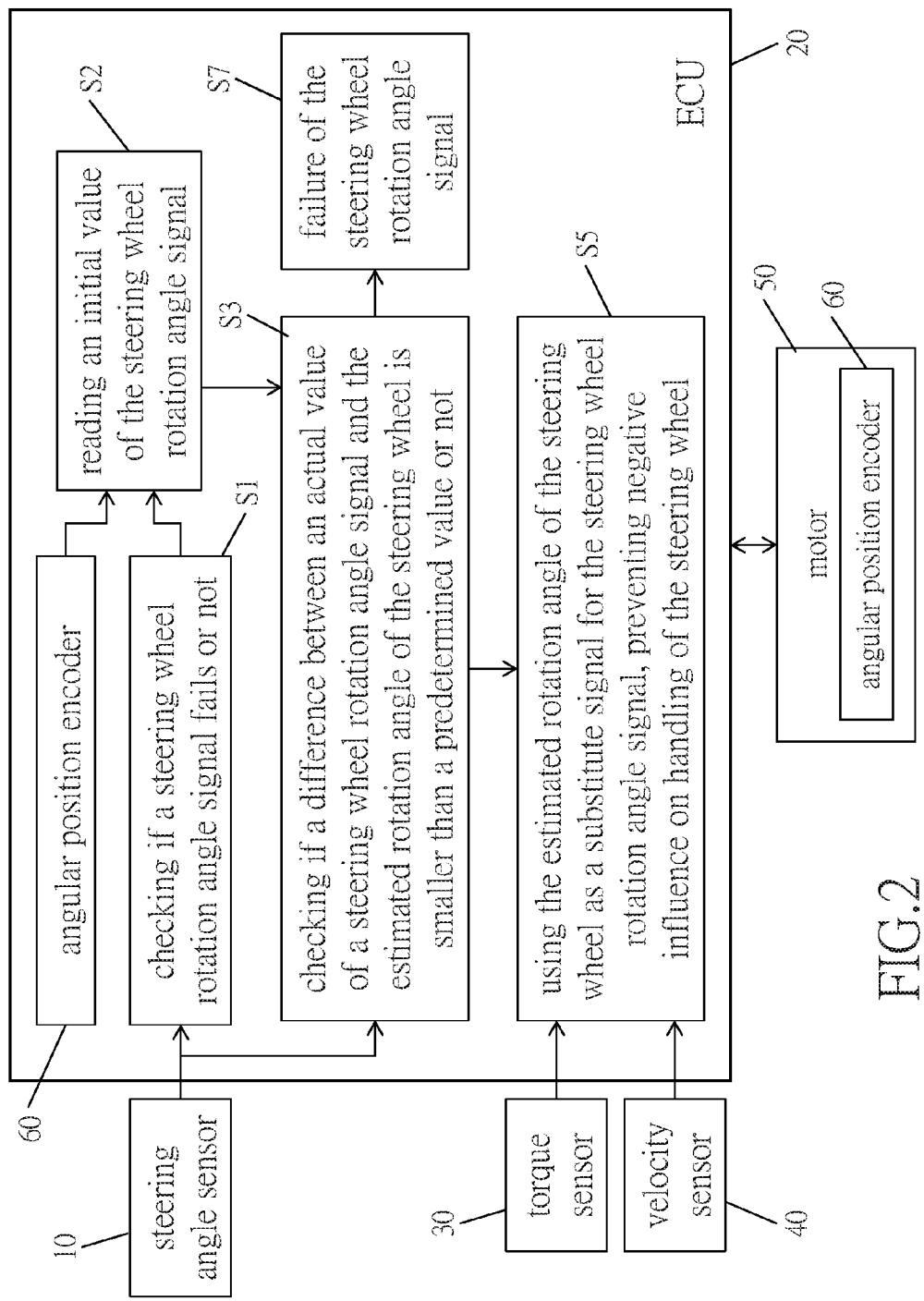
FIG. 2 is a flow chart showing the system for detecting failure of a steering angle sensor in accordance with the present invention.
Figure 3:
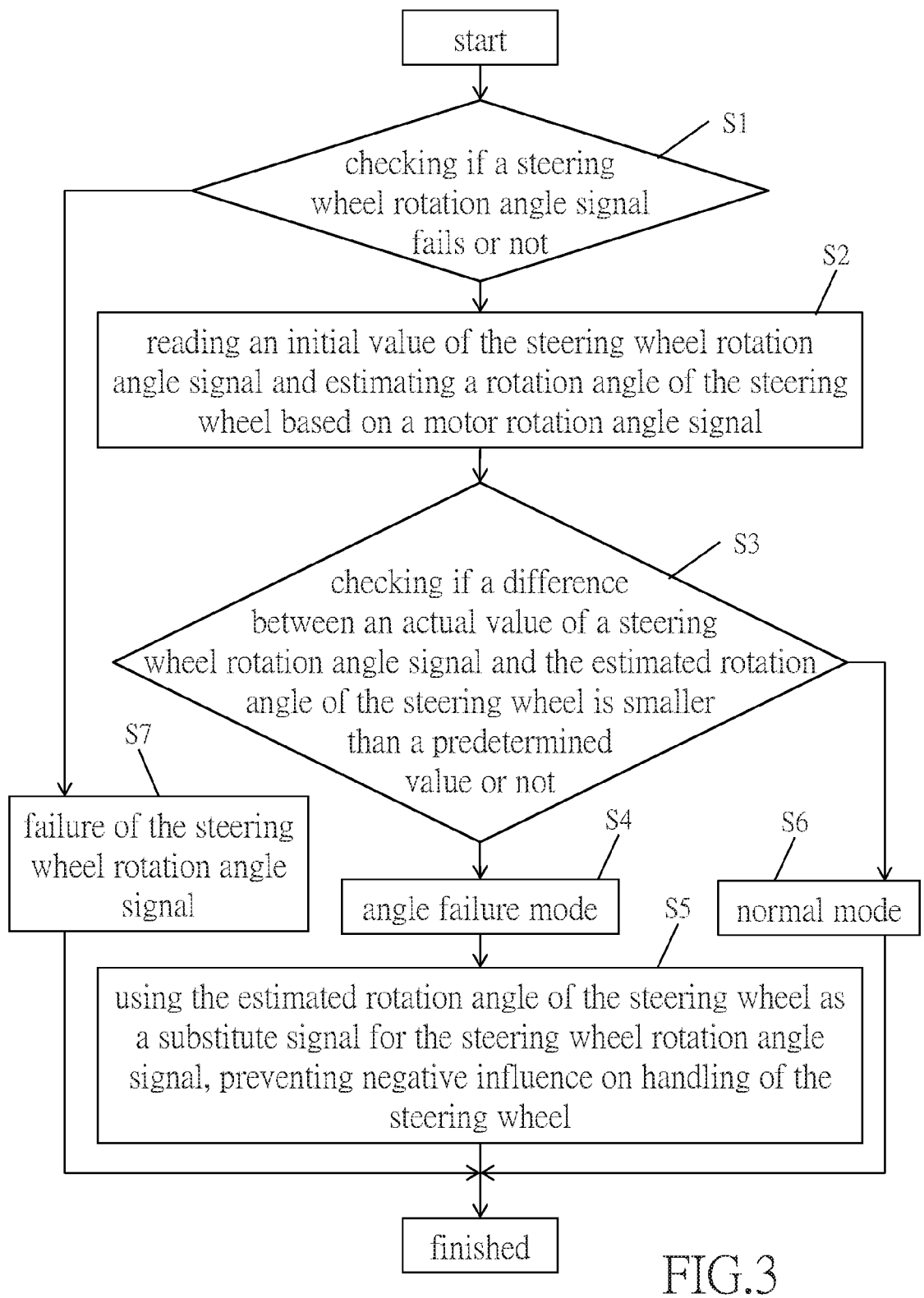
FIG. 3 is a flow chart showing the method for detecting failure of a steering angle sensor in accordance with the present invention.

Referring to FIGS. 2 and 3, a method for detecting failure of a steering angle sensor in accordance with the present invention comprises the following steps:

step S1: checking if a steering wheel rotation angle signal fails or not, if yes, proceeding to step S2, if not, skipping to step S7;

step S2: reading an initial value of the steering wheel rotation angle signal and estimating a rotation angle of the steering wheel based on a motor rotation angle signal;

step S3: checking if a difference between an actual value of a steering wheel rotation angle signal and the estimated rotation angle of the steering wheel is smaller than a predetermined value or not (in this embodiment, the difference value is preferably within ±10 degrees), if yes, skipping to step S6, and if not, proceeding to step S4;

step S4: entering an angle failure mode, indicating a failure of the steering wheel rotation angle signal, proceeding to step S5;

step S5: using the estimated rotation angle of the steering wheel as a substitute signal for the steering wheel rotation angle signal, preventing negative influence on handling of the steering wheel, when the steering wheel rotation angle signal fails;

step S6: finding out in a normal mode that a difference between an actual value of the steering wheel rotation angle signal and the estimated rotation angle of the steering wheel is smaller than a predetermined value, continuing to use the actual value of the steering wheel rotation angle signal;

step S7: finding a failure of the steering wheel rotation angle signal, which means that the steering wheel rotation angle signal fails at the beginning of checking process, therefore, stopping vehicle from starting, so as to prevent negative influence on handling of the steering wheel, when the steering wheel rotation angle signal fails.

step S5 includes using the estimated rotation angle of the steering wheel as a substitute signal for the steering wheel rotation angle signal, and preventing negative influence on handling of the steering wheel, when the steering wheel rotation angle signal fails.

In other words, the key technical feature of the present invention includes calculating the rotation angle of the steering wheel based the initial value of the steering wheel rotation angle signal and the motor rotation angle signal, and checking if a difference between an actual value of a steering wheel rotation angle signal and the estimated rotation angle of the steering wheel is smaller than a predetermined value or not (±10 degrees). If yes, it means that the steering wheel rotation angle signal works well. If not, it means that the steering wheel rotation angle signal fails, and the estimated rotation angle of the steering wheel substitutes the failed steering wheel rotation angle signal. According to the aforementioned embodiments, the difference between the estimated steering wheel rotation angle and the actual value of the steering wheel rotation angle signal is very small, as shown in table 3, no matter the estimated steering wheel rotation angle_est increases (clockwise rotation) or decreases (counterclockwise rotation). The estimated rotation angle of the steering wheel can truly be used a substitute for the steering wheel rotation angle signal and sent to the ECU 20, so the ECU 20 can do the compensation logic calculation to prevent negative influence on the handling of the steering wheel, when the rotation angle signal of the steering wheel fails all of a sudden.

Hence, the present invention has the following advantages over the conventional art:

First of all, the present invention requires no extra sensor and does not increase cost since it makes fully use of the angular position encoder which is an necessary component of an ordinary electrically assisted steering system.

On the other hand, the difference between the estimated steering wheel rotation angle and the actual value of the steering wheel rotation angle signal is very small, which means that the estimated steering wheel rotation angle is relatively accurate. Therefore, when the steering wheel rotation angle signal fails, the estimated rotation angle of the steering wheel can serve as a substitute signal for the steering wheel rotation angle signal, so as to prevent the loss of a part of the function while ensuring good handling of the steering wheel.

While we have shown and described various embodiments in accordance with the present invention, it is clear to those skilled in the art that further embodiments may be made without departing from the scope of the present invention.

What is claimed is:

1. A system for detecting failure of a steering angle sensor being used in an electrically assisted steering system for a vehicle, and the system comprising:
   a steering angle sensor employed to receive a steering wheel rotation signal and send the steering wheel rotation angle to an electronic control unit
   a motor employed to receive a control current from the electronic control unit and provide an assistance power to a steering tie rod to turn the vehicle; and
   an angular position encoder employed to send a motor rotation position signal to the electronic control unit to control the motor;
   the electronic control unit reads an initial value of the steering wheel rotation angle signal and estimates a rotation angle of a steering wheel based on the motor rotation angle signal, the electronic control unit checks if a difference between an actual value of the steering wheel rotation angle signal and an estimated rotation angle of the steering wheel is smaller than a predetermined value or not, if the difference is bigger than the predetermined value, the steering wheel rotation angle signal fails, and the estimated rotation angle of the steering wheel serves as a substitute signal and is sent to the electronic control unit.

2. The system as claimed in claim 1, wherein the estimated rotation angle of the steering wheel is the sum of the initial value of the steering wheel rotation angle signal and a value of change of the angular position encoder.

3. The system as claimed in claim 2, wherein when a motor rotation position signal increases, the value of change of the angular position encoder is calculated by the following equation:

$$\ominus\_add=[(4095-\ominus\_init)+(i-1)*4095+\ominus]/r/p$$

$\ominus\_add$: value of change of the angular position encoder
$\ominus$: signal of the angular position encoder
$\ominus\_init$: initial value of the angular position encoder
r: total reduction ratio
P: value corresponding to 360 degree rotation of the angular position encoder.

4. The system as claimed in claim 2, wherein when a motor rotation position signal decreases, the value of change of the angular position encoder is calculated by the following equation:

$$\ominus\_add=[(0-\ominus\_init)+(i+1)*4095+(\ominus-4095)]r/p$$

$\ominus\_add$: value of change of the angular position encoder
$\ominus$: signal of the angular position encoder
$\ominus\_init$: initial value of the angular position encoder r: total reduction ratio P: value corresponding to 360a degree rotation of the angular position encoder.

5. The system as claimed in claim 1, wherein the difference between the actual value of the steering wheel rotation angle signal and the estimated rotation angle of the steering wheel is within ±10 degrees.

6. The system as claimed in claim 1 further comprising a torque sensor and a velocity sensor, the torque sensor serves to detect relative displacement signal between an input shaft and an output shaft of the steering wheel and sends the relative displacement signal to the electronic control unit, and the velocity sensor receives a velocity signal and sends the velocity signal to the electronic control unit.

7. A method for detecting failure of a steering angle sensor, comprising the following steps:

step S1: checking if a steering wheel rotation angle signal fails or not, if yes, proceeding to step S2;

step S2: reading an initial value of the steering wheel rotation angle signal and estimating a rotation angle of the steering wheel based on a motor rotation angle signal;

step S3: checking if a difference between an actual value of a steering wheel rotation angle signal and the estimated rotation angle of the steering wheel is smaller than a predetermined value or not, if the difference is bigger than the predetermined value, proceeding to step S4;

step S4: entering an angle failure mode, indicating a failure of the steering wheel rotation angle signal, proceeding to step S5; and step S5: using the estimated rotation angle of the steering wheel as a substitute signal for the steering wheel rotation angle signal.

8. The method as claimed in claim 7, wherein when the difference is smaller than the predetermined value, proceeds to step S6 which includes: finding out in a normal mode that the difference between the actual value of the steering wheel rotation angle signal and the estimated rotation angle of the steering wheel is smaller than the predetermined value, continuing to use the actual value of the steering wheel rotation angle signal.

9. The method as claimed in claim 7, wherein when the steering wheel rotation angle signal fails in the step S1, skips to a step S7 which includes: finding a failure of the steering wheel angle signal, the steering wheel rotation angle signal fails at the beginning of checking process, therefore, stopping vehicle from starting, so as to prevent negative influence on handling of the steering wheel.

10. The method as claimed in claim 7, wherein the difference between the actual value of the steering wheel rotation angle signal and the estimated rotation angle of the steering wheel is within ±10 degrees.

* * * * *